United States Patent
Yetukuri et al.

(10) Patent No.: US 10,696,196 B2
(45) Date of Patent: Jun. 30, 2020

(54) ADJUSTABLE VEHICLE SEAT ASSEMBLY

(71) Applicant: Lear Corporation, Southfield, MI (US)

(72) Inventors: Arjun Yetukuri, Rochester Hills, MI (US); Karl Henn, New Hudson, MI (US)

(73) Assignee: Lear Corporation, Southfield, MI (US)

(*) Notice: Subject to any disclaimer, the term of this patent is extended or adjusted under 35 U.S.C. 154(b) by 15 days.

(21) Appl. No.: 15/922,423

(22) Filed: Mar. 15, 2018

(65) Prior Publication Data

US 2019/0283635 A1  Sep. 19, 2019

(51) Int. Cl.
| | |
|---|---|
| *B60N 2/42* | (2006.01) |
| *B60N 2/427* | (2006.01) |
| *B60N 2/02* | (2006.01) |
| *B60R 21/0134* | (2006.01) |
| *B60R 21/015* | (2006.01) |
| *B60R 21/01* | (2006.01) |

(52) U.S. Cl.
CPC ......... *B60N 2/4279* (2013.01); *B60N 2/0244* (2013.01); *B60R 21/0134* (2013.01); *B60R 21/01554* (2014.10); *B60N 2002/0268* (2013.01); *B60R 2021/01013* (2013.01); *B60R 2021/01252* (2013.01)

(58) Field of Classification Search
CPC .................................................. B60N 2/4279; B60N 2/42736; B60N 2/0244; B60N 2002/0268; B60R 21/01554; B60R 21/0134; B60R 2021/01013; B60R 2021/01252
See application file for complete search history.

(56) References Cited

U.S. PATENT DOCUMENTS

| | | | |
|---|---|---|---|
| 8,630,772 B2 | 1/2014 | Ieda et al. | |
| 9,383,872 B2 * | 7/2016 | Yetukuri | B60N 2/0228 |
| 9,511,767 B1 | 12/2016 | Okumura et al. | |

(Continued)

FOREIGN PATENT DOCUMENTS

| | | |
|---|---|---|
| DE | 102014214364 A1 | 2/2016 |
| DE | 102017200005 A1 | 7/2018 |
| WO | 2018122047 A1 | 7/2018 |

OTHER PUBLICATIONS

U.S. Appl. No. 15/383,361, entitled "System and Method for Positioning a Vehicle Seat", filed Dec. 19, 2016, 28 pages.

(Continued)

*Primary Examiner* — Philip F Gabler
(74) *Attorney, Agent, or Firm* — Brooks Kushman P.C.

(57) ABSTRACT

A vehicle seat assembly is provided with a seat bottom pivotally mounted to an actuator and a vehicle floor. A controller is in electrical communication with the actuator and programmed to receive input indicative of a seating position angle, and input indicative of a potential vehicle impact. A signal is output to the actuator to pivot the seat to a nearest one of the plurality of predefined seat orientations if the seating position is not one of the plurality of predefined seat orientations when the input indicative of the potential vehicle impact is received. The signal is not output to the actuator if the seating position is one of the plurality of predefined seat orientations when the input indicative of the potential vehicle impact is received. The plurality of predefined seat orientations is offset radially at sequential increments.

12 Claims, 4 Drawing Sheets

(56) References Cited

U.S. PATENT DOCUMENTS

2015/0352979 A1    12/2015  O'Bannon et al.
2016/0339802 A1*   11/2016  Hanlon .............. B60N 2/0244
2018/0194247 A1*    7/2018  Kim ................... B60N 2/0244
2018/0281623 A1*   10/2018  Matsumoto ......... B60N 2/0244
2018/0281625 A1*   10/2018  Akaba ............... B60R 21/0134

OTHER PUBLICATIONS

U.S. Appl. No. 15/453,304, entitled "System and Method for Positioning a Vehicle Seat", filed Mar. 8, 2017, 21 pages.
German Office Action for Application No. 10 2019 201 583.7, dated Nov. 20, 2019, 5 pages.

* cited by examiner

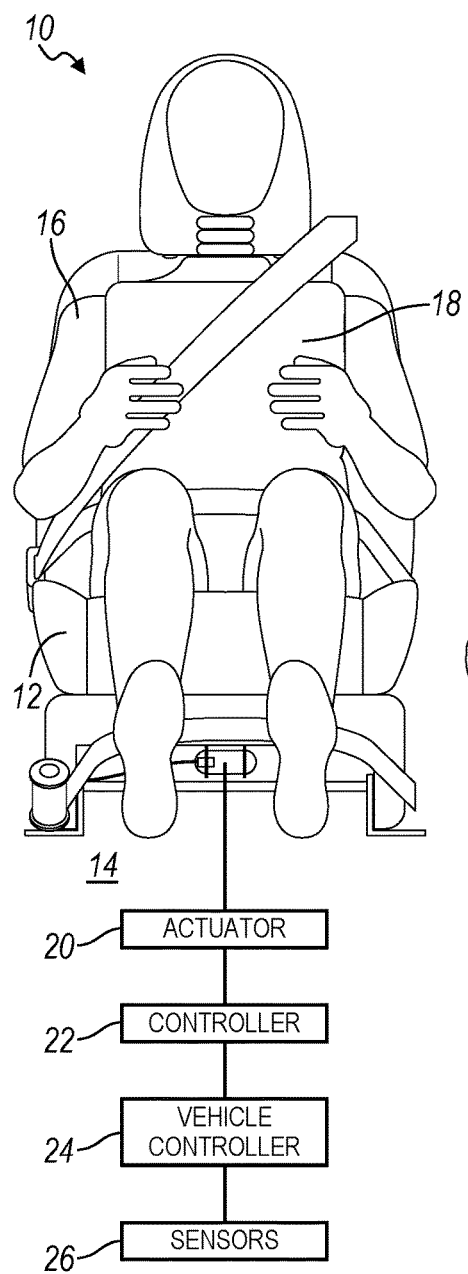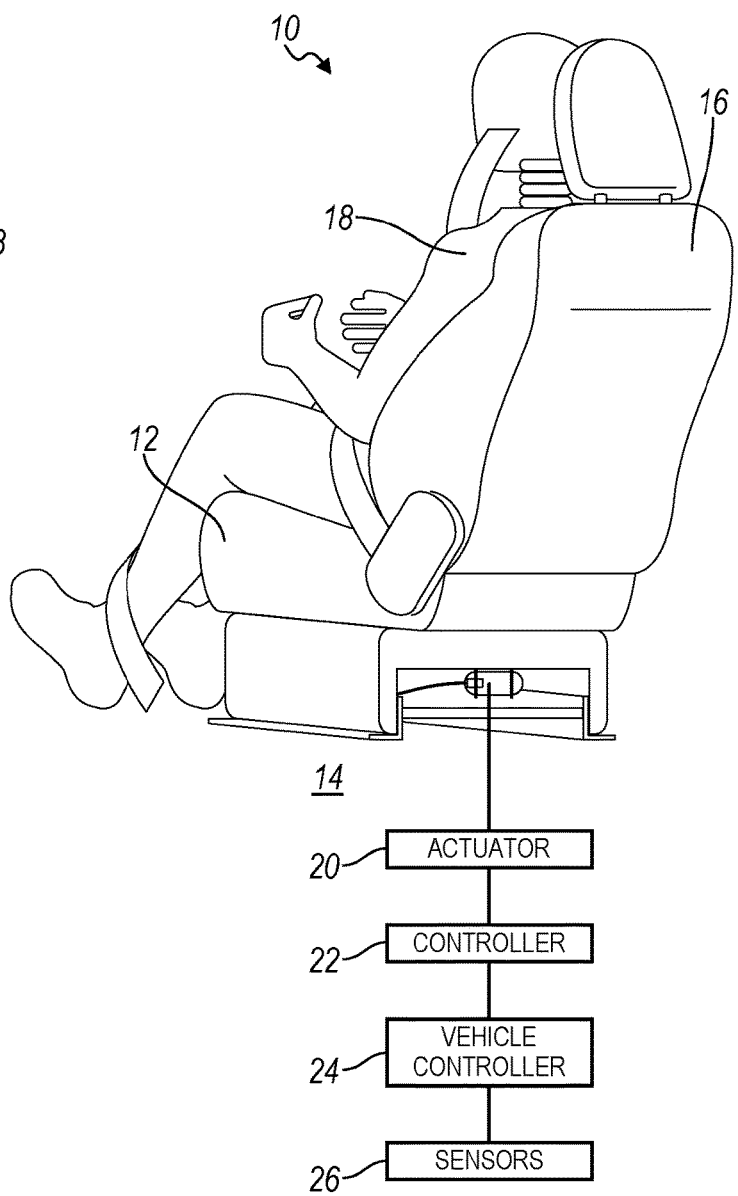
FIG. 1
FIG. 2

ADJUSTABLE VEHICLE SEAT ASSEMBLY

TECHNICAL FIELD

Various embodiments relate to adjustable vehicle seat assemblies.

BACKGROUND

An adjustable vehicle seat assembly is illustrated and disclosed in Lear Corporation United States Patent Application Publication Number US 2015/0352979 A1, which published on Dec. 10, 2015.

SUMMARY

According to at least one embodiment, a vehicle seat assembly is provided with a seat bottom adapted to be pivotally mounted to a vehicle floor. An actuator is in cooperation with the seat bottom and the vehicle floor to pivot the seat bottom relative to the vehicle floor. A controller is in electrical communication with the actuator and programmed to receive input indicative of a potential vehicle impact. A signal is output to the actuator to pivot the seat to a predefined seat orientation in response to receiving the input indicative of the potential vehicle impact.

According to a further embodiment, the controller is further programmed to receive input indicative of a direction of the potential vehicle impact. A mitigated risk seating orientation is determined for the direction of the potential vehicle impact. The signal is output to the actuator to pivot the seat assembly to the mitigated risk seating orientation in response to receiving the input indicative of the potential vehicle impact and the input indicative of the direction of the potential impact.

According to another further embodiment, the controller is further programmed to receive input indicative of a seating position angle.

According to an even further embodiment, the controller is further programmed to determine if the seating position angle is one of a plurality of predefined seat orientations.

According to another even further embodiment, the controller is further programmed to output the signal to the actuator to pivot the seat assembly to a nearest one of the plurality of predefined seat orientations in response to receiving the input indicative of the potential vehicle impact.

According to another even further embodiment, the controller is further programmed to output the signal to the actuator if the seating position angle is not one of the plurality of predefined seat orientations when the input indicative of the potential vehicle impact is received.

According to an even further embodiment, the controller is further programmed to not output the signal to the actuator if the seating position angle is one of the plurality of predefined seat orientations when the input indicative of the potential vehicle impact is received.

According to another even further embodiment, the plurality of predefined seat orientations is offset radially at sequential increments.

According to another even further embodiment, the plurality of predefined seat orientations includes a forward-facing seat orientation and a rearward-facing seat orientation.

According to a further embodiment, the plurality of predefined seat orientations includes at least one laterally-facing seat orientation.

According to another even further embodiment, the plurality of predefined seat orientations is offset radially at sequential increments of forty-five degrees.

According to at least another embodiment, an autonomous vehicle is provided as a land vehicle with a vehicle floor, at least one impact sensor, and a controller in cooperation with the land vehicle to control travel of the land vehicle, and in cooperation with the at least one impact sensor to output a signal indicative of a potential vehicle impact. At least one vehicle seat assembly is provided with a seat bottom pivotally mounted to the vehicle floor. An actuator is in cooperation with the seat bottom and the vehicle floor to pivot the seat bottom relative to the vehicle floor. A seat assembly controller is in electrical communication with the vehicle controller and the actuator and programmed to receive input indicative of a potential vehicle impact. A signal is output to the actuator to pivot the seat to a predefined seat orientation in response to receiving the input indicative of the potential vehicle impact.

According to at least another embodiment, a computer-program product is embodied in a non-transitory computer readable medium that is programmed to automatically adjust a seat assembly. The computer-program product has instructions to receive input indicative of a potential vehicle impact, and output a signal to an actuator in cooperation with a vehicle floor and a seat bottom of the seat assembly to pivot the seat bottom to a predefined seat orientation in response to receiving the input indicative of the potential vehicle impact.

According to a further embodiment, the computer-program product further includes instructions to receive input indicative of a direction of the potential vehicle impact. A mitigated risk seating orientation is determined for the direction of the potential vehicle impact. The signal is output to the actuator to pivot the seat assembly to the mitigated risk seating orientation in response to receiving the input indicative of the potential vehicle impact and the input indicative of the direction of the potential vehicle impact.

According to another further embodiment, the computer-program product further includes instructions to receive input indicative of a seating position angle.

According to an even further embodiment, the computer-program product further includes instructions to determine if the seating position angle is one of a plurality of predefined seat orientations.

According to an even further embodiment, the computer-program product further includes instructions to output the signal to the actuator to pivot the seat assembly to a nearest one of the plurality of predefined seat orientations in response to receiving the input indicative of the potential vehicle impact.

According to another even further embodiment, the computer-program product further includes instructions to output the signal to the actuator if the seating position angle is not one of the plurality of predefined seat orientations when the input indicative of the potential vehicle impact is received.

According to an even further embodiment, the computer-program product further includes instructions to not output the signal to the actuator if the seating position angle is one of the plurality of predefined seat orientations when the input indicative of the potential vehicle impact is received.

According to at least one embodiment, a vehicle seat assembly is provided with a seat bottom adapted to be pivotally mounted to a vehicle floor. An actuator is in cooperation with the seat bottom and the vehicle floor to pivot the seat bottom relative to the vehicle floor. A controller is in electrical communication with the actuator and programmed to receive input indicative of a seating position angle. Input indicative of a potential vehicle impact is received. A determination is made if the seating position angle is one of a plurality of predefined seat orientations. A signal is output to the actuator to pivot the seat to a nearest one of the plurality of predefined seat orientations if the seating position is not one of the plurality of predefined seat orientations when the input indicative of the potential vehicle impact is received. The signal is not output to the actuator if the seating position is one of the plurality of predefined seat orientations when the input indicative of the potential vehicle impact is received. The plurality of predefined seat orientations is offset radially at sequential increments.

BRIEF DESCRIPTION OF THE DRAWINGS

FIG. 1 is a front perspective view of a seat assembly illustrated schematically in a seating position in a vehicle environment according to an embodiment;

FIG. 2 is another front perspective view of the seat assembly of FIG. 1, illustrated in another a seating position;

DETAILED DESCRIPTION

Figure 3:
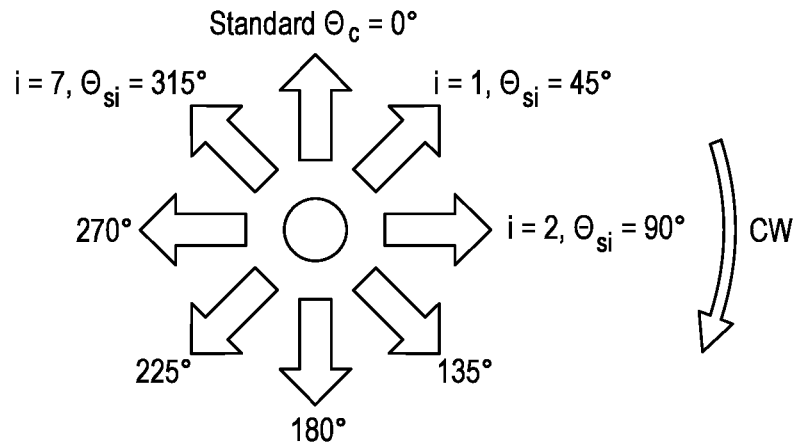
FIG. 3 is a schematic diagram of seating positions of the seat assembly of FIG. 1, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional seating technologies and corresponding safety technologies are designed to protect an occupant in a standard seating orientation, such as a forward-facing seating position. An example of a baseline or forward-facing seating position of a seat assembly is illustrated with a seat assembly 10 in FIG. 1, whereby the view is taken from a perspective facing a front of an associated vehicle. Current technologies are designed to manage loads and occupant kinematics when seated in the forward-facing position of FIG. 1. Although a driver seat assembly 10 is illustrated and described, any seat assembly in any row is contemplated.

With the advent of autonomous vehicles, a driver is permitted to disengage from a responsibility of driving. An autonomous vehicle driver has a role as a supervisor, more than a controller of the driving operations. Accordingly, a driver may be prone to engage in other activities while the vehicle is travelling. Accordingly, a vehicle seat assembly, such as the seat assembly 10 in FIGS. 1 and 2, for autonomous vehicles accommodates the autonomous vehicle driver by permitting the driver to swivel to various seating positions. By offering various pivoted seating positions to the driver, the driver is permitted to swivel to various non-standard seating orientations, such as the seating position of FIG. 2, which is also viewed from a front perspective of the vehicle as in FIG. 1.

By varying the seating position to various non-standard seating positions, a direction of an impact in a crash situation becomes non-standard as well. A frontal impact may be converted to a side impact relative to the seat assembly 10, if the seat assembly 10 is turned ninety degrees clockwise or ninety degrees counterclockwise. Vehicles and seat assemblies are often designed to withstand certain loads in certain loading conditions. The seat assembly 10 may be designed to manage occupant kinematics in certain loading conditions such as front, rear or lateral impacts. The seat assembly 10 may also be designed to manage occupant kinematics in predefined intermediate loading conditions also.

If a seat assembly remains in a non-standard position that has not been validated in a crash situation, unintended loading conditions may be applied to the seat assembly. Designing a seat assembly to withstand every conceivable non-seating orientation may be cost-prohibitive, and may be not be practical. For example, a seat assembly that is designed to withstand impact conditions from every angle may be excessively robust and may have a negative impact on fuel economy standards. However, if the varying seating positions are controlled or restricted to a minimal number of non-standard seating positions under impact conditions, the design of the seat assembly 10 stays within the design and marketability restraints set forth by the existing market.

In order to permit the various seating positions, the seat assembly 10 includes a seat bottom 12 that is pivotally connected to a vehicle floor 14. A seat back 16 extends at an angle from the seat bottom 12 to support a back of a seated occupant 18. The seat assembly 10 includes a rotary actuator 20 in cooperation with the seat bottom 12 and the vehicle floor 14 to pivot the seat bottom 12 relative to the vehicle floor 14.

A controller 22 is in electrical communication with the actuator 20 to control the actuator 20 to control the operation of the actuator 20. The controller 22 may be a module within a vehicle controller 24. Alternatively, the controller 22 may be disposed within or under the vehicle seat assembly 10. The methodology of the controller 22 may be stored on a physical module or may be stored on any computer-program product that may be embodied in a non-transitory readable medium that is programmed to automatically adjust the seat assembly 10.

The controller 22 may operate to pivot the seat assembly 10 in response to operator instructions through a user interface. Alternatively, the seat assembly 10 may permit manual adjustments, whereby the actuator 20 only pivots the seat assembly 10 under predefined conditions set forth in the controller 22.

The seat assembly 10 prepares the seat assembly 10, and consequently the occupant 18 for impact conditions by actuating the seat assembly 10 from a non-standard seating position to a standard seating position in response to detecting a potential impact or an imminent impact of the vehicle. FIG. 3 illustrates a graphic of various seating positions. According to an embodiment, a plurality of standard seating positions is selected. According to the embodiment, the plurality of validated seating positions is selected in a radial array, with a sequence of forty-five degree increments as depicted in FIG. 3. At this increment, validated seating positions of forward-facing, lateral-facing (right and left), rearward-facing, and intermediate positions between each of the other four positions. Of course, any quantity and any arrangement of standard seating positions is contemplated. The standard seating positions are selected to provide a finite quantity of standard seating positions for designing safety features; and the safety features are tested and validated for the standard seating positions.

In FIG. 3, $\Theta_C$ is a measurement of a current seat orientation angle, which may be detected by sensors in the seat bottom 12 and or the actuator 20 of the seat assembly 10. $\Theta_{si}$ is a validated seat orientation angle. An index of clockwise sequential seating positions from the baseline standard position of zero degrees is indicated by "i" and is increased up to seven positions in FIG. 3. Referring again to FIG. 1, the seat assembly 10 is illustrated in the standard baseline seating position, wherein $\Theta_C$ equals zero degrees. FIG. 2 illustrates the seat assembly 10 indexed to the third position, wherein i equals 3, and $\Theta_{si}$ is 135 degrees.

The seat assembly 10 provides dynamic safety by articulating the seat assembly 10 for use in vehicle environments, particularly autonomous vehicles, wherein non-standard seating positions are accommodated. A select number of non-standard seating orientations are identified as validated or preferred orientations (PO) for the seat assembly 10 design to function per specifications under non-standard loading conditions.

With reference again to FIGS. 1 and 2, the controller 22 is in communication with the vehicle controller 24. Alternatively, the seat assembly controller 22 may be embodied within the vehicle controller 24. The vehicle controller 24 is in communication with various vehicle safety features, including impact sensors 26. The vehicle controller 24 receives input from the impact sensors 26 that indicate that a vehicle impact is imminent. This information is communicated to the vehicle seat assembly controller 22. The seat assembly controller 22 processes the impact information in order to control the actuator 20 and adjust the seat assembly 10 to a predefined seat orientation, such as a standard or preferred seating orientation, based upon the potential impact information. The seat assembly 10 is adjusted to a standard or preferred seating orientation before impact in order to place the occupant 18 in a validated seating position before and during impact.

Figure 4:
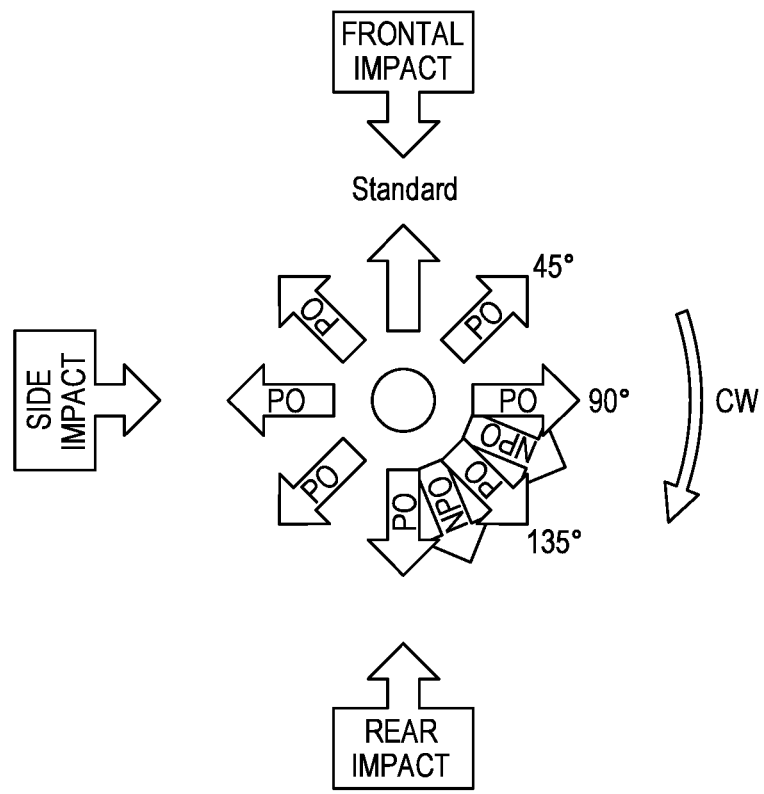
FIG. 4 is another schematic diagram of seating positions of the seat assembly of FIG. 1, illustrated with a plurality of impact conditions.

Referring now to FIG. 4, the seat assembly controller 22 determines a seating orientation before a crash occurs. The seating orientation is determined by receiving input of the angle of the seat assembly 10 relative to the vehicle floor 14 as measured by the actuator 20, or a position sensor(s) in the seat bottom 12 and/or the vehicle floor 14. The controller 22 determines whether the seating angle is a preferred seating orientation, which for the depicted embodiment are labeled PO in FIG. 4. The controller 22 also determines whether the seating angle is a non-preferred orientation, which are labeled as NPO in FIG. 4.

FIG. 4 illustrates schematically a plurality of impact sensors 26 for detecting various potential impact conditions, such as "frontal impact", "side impact", and "rear impact". In response to determining that the seat assembly 10 is positioned in a non-preferred seating orientation, and in response to determining that an impact condition is detected, the controller 22 actuates the actuator 20 to place the seat assembly 10 in a preferred seating orientation before the impact.

Figure 5:
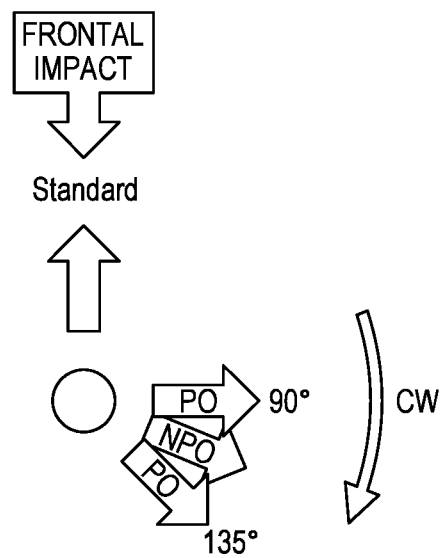
FIG. 5 is a schematic diagram of seating positions of the seat assembly of FIG. 1, according to another embodiment.

Referring now to FIG. 5, the controller 22 determines that the seating angle is at a non-preferred seating orientation or NPO. After receiving an indication that an impact from any direction is imminent, the controller 22 promptly articulates the seat assembly 10 to the nearest known non-standard preferred orientation or PO. The controller 22 does not necessarily rotate the seat assembly 10 to the standard orientation, if there is a preferred seating orientation PO between the current NPO and the standard orientation.

For example, if the current non-preferred seating orientation of FIG. 5, is one hundred degrees; and a potential crash is detected in the front direction, the controller 22 pivots the seat assembly 10 to the "preferred orientation" of ninety degrees as measured clockwise from the standard forward-facing seating position.

Figure 6:
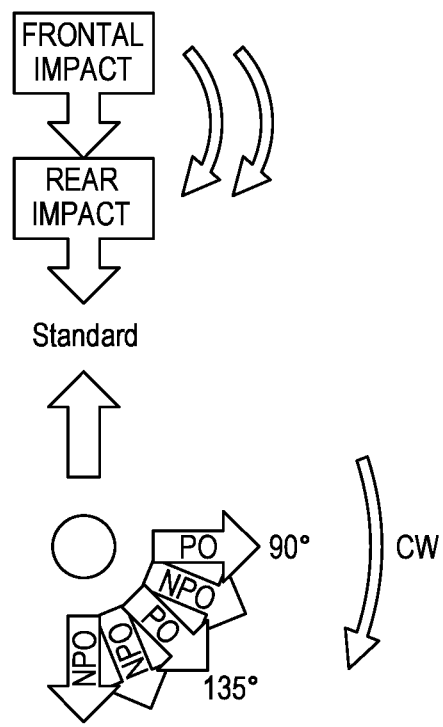
FIG. 6 is a schematic diagram of seating positions of the seat assembly of FIG. 1, according to another embodiment.

Referring now to FIG. 6, another embodiment is illustrated. A direction of the impact can also be evaluated by the seat assembly controller 22 to articulate the seat assembly 10 to one of the preferred orientations PO. The selected PO is determined based on a validated robustness of the seat assembly 10 in a particular direction of impact, in order maximize a performance of the seat assembly 10 under a particular impact condition.

For example, if the potential crash is a frontal impact as shown in FIG. 6, and if the seat assembly 10 is measured at a non-preferred seating orientation NPO of 120 degrees, the seat assembly controller 22 may determine that it may be more efficient from a load management and occupant kinematics validation to articulate the seat assembly to the preferred seating orientation PO of 180 degrees to convert the potential frontal impact, to a rear impact in the perspective of the applicable loads upon the seat assembly 10. Such seat adjustment may mitigate risk of the impact condition by selecting the appropriate NPO.

Figure 7:
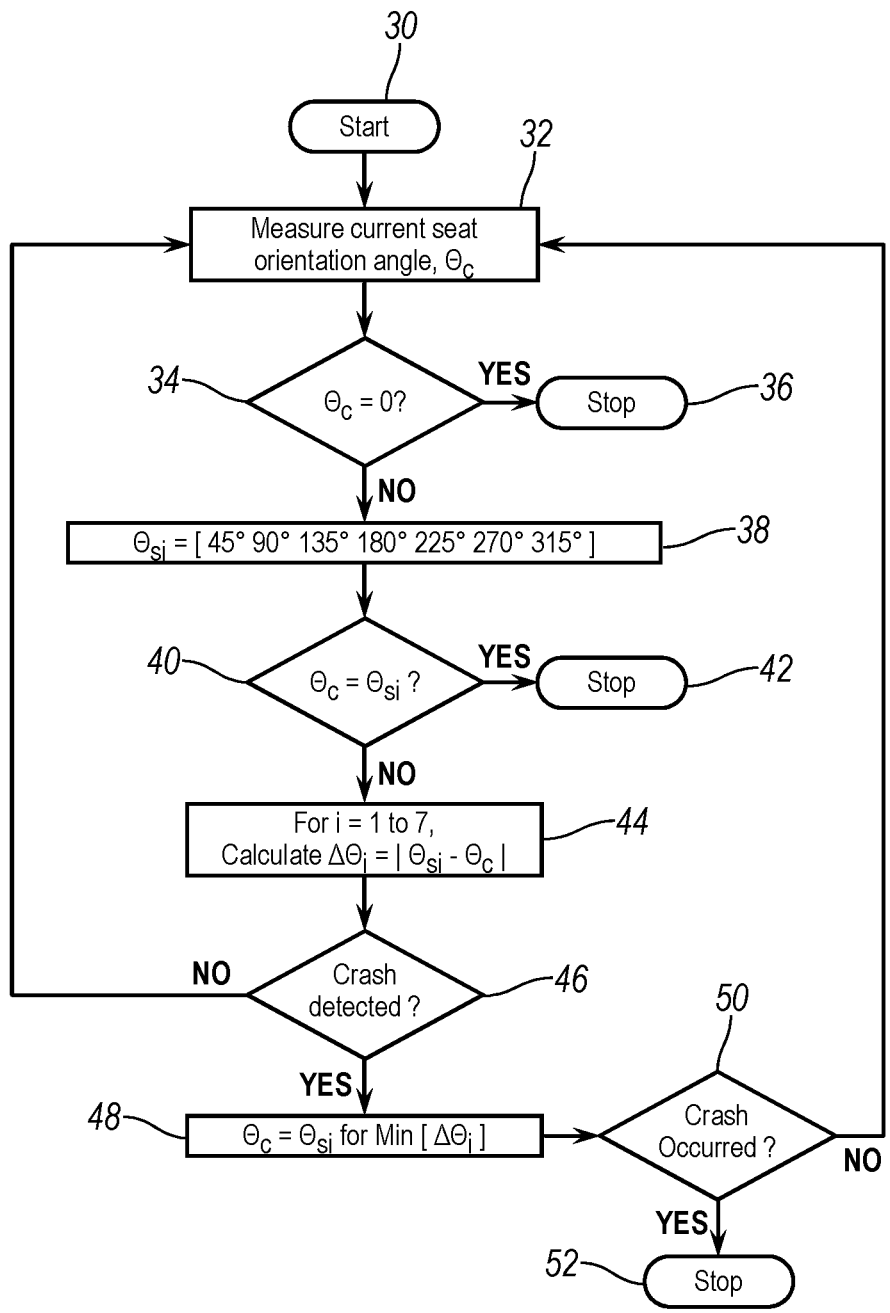
FIG. 7 is a flowchart of a method to adjust the seat assembly of FIG. 1, according to another embodiment.

FIG. 7 illustrates a method for adjusting the seat assembly 10 as performed by the controller 22 according to an embodiment. The values in the flowchart correspond to those utilized in prior embodiments, such those utilized and described with reference to FIG. 3. At block 30 the method is initiated. At block 32, the current seat orientation angle $\Theta_C$ is measured. Then, at block 34, the controller 22 determines if the current seat orientation angle $\Theta_C$ equals zero. If so, then at block 36, the program stops because the current seat orientation is at the standard or baseline position. Readjustment of the seat assembly 10 may cause the program to reinitiate again at block 30.

At block 34, if the current seat orientation angle $\Theta_C$ does not equal zero, then the method proceeds to block 38 where the validated seat orientations $\Theta_{si}$ are determined. For the depicted embodiment, the validated seat orientations are a radial array of forty-five-degree increments resulting in validated seat orientation angles $\Theta_{si}$ at forty-five degrees, ninety degrees, 135 degrees, 180 degrees, 225 degrees, 270 degrees, and 315 degrees. Then at block 40 the current seat orientation angle $\Theta_C$ is compared to the validated seat orientation angles $\Theta_{si}$. If the current seat orientation angle $\Theta_C$ is one of the validated seat orientation angles $\Theta_{si}$, then at block 42, the method is completed. The method can be restarted upon an adjustment of the seat assembly 10.

At block 40 if the current seat orientation angle $\Theta_C$ is not one of the validated seat orientation angles $\Theta_{si}$, then the method proceeds to block 44. At block 44, the current seat orientation angle $\Theta_C$ is compared to each of the validated seat orientation angles $\Theta_{si}$. Block 44 calculates a rotation $\Delta\Theta_i$ to each validated seating position by finding an absolute value of the difference $|\Theta_{si} - \Theta_C|$ between the current seat orientation angle $\Theta_C$ and each validated seat orientation angle $\Theta_{si}$ to determine the nearest validated seat orientation angle $\Theta_{si}$. Then at block 46, the controller 22 determines if a crash condition has been detected. If not, then the method is repeated at block 32.

If a crash is detected at block 46, then at block 48 the controller 22 operates the actuator 20 adjust the current seat orientation angle $\Theta_C$ to the validated seat orientation angle $\Theta_{si}$ that is nearest or has a minimum rotary travel to reach Min[$\Delta\Theta_i$]. At block 50 the seat assembly controller 22 determines from the vehicle controller 24 whether a crash occurred. If a crash has not occurred, then the method repeats at block 32. If a crash has not occurred, then the method stops at block 52.

The seat assembly 10 may employ additional features in combination with adjusting the current seat orientation angle $\Theta_C$. These adjustments may be performed independently before a crash, of concurrently with pivoting of the seat assembly 10. For example, the seat cushion 12 may be articulated to change an angle of the cushion 12 to stabilize the occupant 18. Under another example, the seat back 16 may be articulated to change a recline angle to maximize engagement between the occupant 18 and the seat back 16. Comfort features may also be articulated by the controller 22 enhance the contact between the occupant 18 and the seat assembly 10. Seat bolsters in the seat cushion 12 and the seat back 16 may be adjusted in firmness to enhance retention of the occupant 18 between the bolsters of the seat assembly 10. Audible, haptic, and/or visual warnings may be employed to communicate to the occupant 18 of the impending articulation.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat bottom adapted to be pivotally mounted to a vehicle floor;
   an actuator in cooperation with the seat bottom and the vehicle floor to pivot the seat bottom relative to the vehicle floor; and
   a controller in electrical communication with the actuator and programmed to:
     receive input indicative of a potential vehicle impact,
     receive input indicative of a seating position angle,
     determine if the seating position angle is one of a plurality of predefined seat orientations, and
     output a signal to the actuator to pivot the seat assembly to a nearest one of the plurality of predefined seat orientations in response to receiving the input indicative of the potential vehicle impact.

2. The vehicle seat assembly of claim 1 wherein the controller is further programmed to:
   receive input indicative of a direction of the potential vehicle impact;
   determine a mitigated risk seating orientation for the direction of the potential vehicle impact; and
   output the signal to the actuator to pivot the seat assembly to the mitigated risk seating orientation in response to receiving the input indicative of the potential vehicle impact and the input indicative of the direction of the potential impact.

3. The vehicle seat assembly of claim 1 wherein the controller is further programmed to output the signal to the actuator if the seating position angle is not one of the plurality of predefined seat orientations when the input indicative of the potential vehicle impact is received.

4. The vehicle seat assembly of claim 3 wherein the controller is further programmed to not output the signal to the actuator if the seating position angle is one of the plurality of predefined seat orientations when the input indicative of the potential vehicle impact is received.

5. The vehicle seat assembly of claim 1 wherein the plurality of predefined seat orientations is offset radially at sequential increments.

6. The vehicle seat assembly of claim 1 wherein the plurality of predefined seat orientations includes a forward-facing seat orientation and a rearward-facing seat orientation.

7. The vehicle seat assembly of claim 6 wherein the plurality of predefined seat orientations includes at least one laterally-facing seat orientation.

8. The vehicle seat assembly of claim 1 wherein the plurality of predefined seat orientations is further defined as a radial array with increments of forty-five degrees.

9. An autonomous vehicle comprising:
   a land vehicle with a vehicle floor;
   at least one impact sensor;
   a controller in cooperation with the land vehicle to control travel of the land vehicle, and in cooperation with the at least one impact sensor to output a signal indicative of a potential vehicle impact; and
   at least one seat assembly according to claim 1 mounted to the vehicle floor, wherein the seat assembly controller is in communication with the autonomous vehicle controller.

10. A vehicle seat assembly comprising:
   a seat bottom adapted to be pivotally mounted to a vehicle floor;
   an actuator in cooperation with the seat bottom and the vehicle floor to pivot the seat bottom relative to the vehicle floor; and
   a controller in electrical communication with the actuator and programmed to:
     receive input indicative of a seating position angle,
     receive input indicative of a potential vehicle impact,
     determine if the seating position angle is one of a plurality of predefined seat orientations,
     output a signal to the actuator to pivot the seat to a nearest one of the plurality of predefined seat orientations if the seating position is not one of the plurality of predefined seat orientations when the input indicative of the potential vehicle impact is received, and
     not output the signal to the actuator if the seating position is one of the plurality of predefined seat orientations when the input indicative of the potential vehicle impact is received; and
   wherein the plurality of predefined seat orientations is offset radially at sequential increments.

11. The vehicle seat assembly of claim 1 wherein the plurality of predefined seat orientations is further defined as a finite number of predefined seat orientations designed to withstand impact conditions.

12. The vehicle seat assembly of claim 11 wherein the plurality of predefined seat orientations is further defined as a radial array with increments of forty-five degrees.

* * * * *